United States Patent [19]

Murray et al.

[11] Patent Number: 4,797,919

[45] Date of Patent: Jan. 10, 1989

[54] RECEIVER HAVING AN INTERFACE WITH A SUB-SYSTEM

[75] Inventors: Bruce Murray, Wokingham, England; Louis Guillou, Bourgbarre, France; Françoise M. R. Coutrot, Liffre, France

[73] Assignees: U.S. Philips Corporation, New York, N.Y.; Etablissement Public de Diffusion de France; Etat Francais, both of France

[21] Appl. No.: 934,872

[22] Filed: Nov. 25, 1986

[30] Foreign Application Priority Data

Nov. 25, 1985 [GB] United Kingdom ............ 8529003

[51] Int. Cl.[4] .................................. H04L 9/04
[52] U.S. Cl. .................................. 380/20; 380/10
[58] Field of Search .................. 380/10, 14, 20

[56] References Cited

U.S. PATENT DOCUMENTS

| | | | |
|---|---|---|---|
| 4,475,123 | 10/1984 | Dumbould et al. | 380/20 |
| 4,600,921 | 7/1986 | Thomas | 380/20 |
| 4,613,901 | 9/1986 | Gilhousen | 380/20 |
| 4,649,419 | 3/1987 | Arragon et al. | 380/20 |
| 4,694,489 | 9/1987 | Frederiksen | 380/20 |

Primary Examiner—Salvatore Cangialosi
Attorney, Agent, or Firm—Gregory P. Gadson

[57] ABSTRACT

A receiver having an interface arrangement for connection between a television circuit and a conditional access sub-system conveys data via a bus having a four frame bus cycle period with a bit rate corresponding to the line rate. During a first part of the bus cycle period data is conveyed from the receiver to the sub-system sequentially as follows:

i. an address block of 1 byte with the unique address of the sub-system with which the receiver is in communication, ii. a status block of 1 byte providing status information for the following blocks in the first part, iii,iv,v. three data blocks each of 93 bytes and each containing an entitlement message, vi. a keying block of 1 byte conveying keyboard or remote control commands, and vii,viii. a further block of either ½ byte (vii) or 2½ bytes (vii+viii) conveying frame count information.

During the second and remaining part of the bus cycle period which comprises 30 or 28 bytes, depending on the length of the further block, data is transmitted from the sub-system to the receiver.

6 Claims, 3 Drawing Sheets

RECEIVER HAVING AN INTERFACE WITH A SUB-SYSTEM

BACKGROUND OF THE INVENTION

The present invention relates to a receiver having an interface arrangement for connection between said receiver and a conditional access sub-system.

In the evolution of the specifications for MAC-packet television transmission systems which are currently represented by the European Broadcasting Union documents "Television Standards for the Broadcasting Satellite Service—Specification of the C-MAC/Packet System"—SPB 284, 3rd revised version published December 1984 and "Methods of Conveying C-MAC/Packet Signals in Small and Large Community Antenna and Cable Network Installations"—SPB 352 published December 1984, which documents are incorporated herein by way of reference, the requirement to scramble vision, sound and data services for conditional access purposes was identified as an important requirement at an early stage. For this reason, all members of the MAC-packet family permit, using a standardized method of conveyance, the transmission of two types of entitlement message. These are:

(i) Entitlement Checking Messages (ECMs), which allow the conditional access sub-system to derive the control words for a service or set of services. These control words are 60 bits long, and are used as inputs to the descrambling circuitry contained within the decoder for the MAC signal. These are sent to all customers.

(ii) Entitlement Management Messages (EMMs), which can be addressed to specific customers or groups of customers. The use of the packet multiplex to convey these messages is generally referred to as "over-air addressing", although this is not the only conveyance method. For example, postal or telephony networks could be used—different broadcasters will possibly use different methods depending upon their operational preferences. Specific users and groups of users are identified respectively by a Unique Customer Address (UCA) of 36 bits and a Shared Customer Address (SCA) of 24 bits.

Each of these message types is allocated a different address within the packet multiplex. Within an r.f. channel there will usually be only one EMM service (and hence one EMM packet address) but in the most general case there can be several ECM channels, carried on different packet addresses, each one corresponding to a separately scrambled service set. It can readily be seen, therefore, that depending upon the operational conditions of individual broadcasters, the contents (in terms of data capacity) of the ECM and EMM channels may vary considerably. For example, where a broadcaster does not use over-air addressing EMM packets are not transmitted.

SUMMARY OF THE INVENTION

It is an object of the invention to provide a receiver with an interface arrangement which can cater for such differing message conditions.

The invention provides a receiver having an interface arrangement for connection between said receiver and a conditional access sub-system and comprising a bus having a first line for conveying clock signals at television line frequency rate from said receiver to said sub-system, a second line for conveying data with a bit rate corresponding to that of the clock signal from said receiver to said sub-system during a first part of a bus cycle period and from said sub-system to said receiver during the remaining part of said bus cycle period, and a third line for conveying a direction signal indicating to said sub-system the direction of data travel on said second line, the bus cycle period having a duration equal to four television frame periods, the data on said second line during the first part of each bus cycle period including:

i. an address block containing the unique address of the sub-system with which said receiver is in communication, ii. a status block providing status information for individual following blocks in the first part of the bus cycle period, iii. a plurality of data blocks each of equal length and each conveying entitlement messages, and iv. a further block having either first or a second greater duration which provides information relating to a frame count, said status block in the case of said data blocks of equal length indicating the type of entitlement message being conveyed in each such block whilst in the case of said further block said status block indicates the duration of the said further block.

Such an interface arrangement in a receiver allows data blocks to be dynamically allocated and the capacity provided can therefore be effectively used by any combination of entitlement messages (ECM's and EMM's in the case of MAC-packet signals) provided their total does not exceed the interface capacity.

The further block, when of the first duration, may convey the least significant bits of the frame count. Although these bits may not be required in the sub-system this does have the advantage that when this block is of the second duration only the remaining bits of the frame count need to be provided in the additional part of this block.

The data on the second line during the first part of each bus cycle period may additionally include a keying block which conveys keyboard or remote control commands, the status block in the case of this keying block indicating the validity of this block.

The invention also provides a receiver havng an interface arrangement for connection between said receiver and a conditional access sub-system and comprising a bus having a first line for conveying clock signals at television line frequency rate from said receiver to said sub-system, a second line for conveying data with a bit rate corresponding to that of the clock signal and with 8 bits per byte from said receiver to said sub-system during a first part of a bus cycle period and from said sub-system to said receiver during the remaining part of said bus cycle period, and a third line for conveying a direction signal indicating to said sub-system the direction of data travel on said second line, the bus cycle period having a duration equal to four television frame periods, the data on said second line during the first part of each bus cycle period including sequentially:

i. an address block of 1 byte containing the unique address of the sub-system with which said receiver is in communication, ii. a status block of 1 byte providing status information for the following and remaining individual blocks in the first part of the bus cycle period, iii. three data blocks each of 93 bytes and each containing an entitlement message,
iv. a keying block of 1 byte conveying keyboard or remote control commands, and
v. a further block of either ½ byte or 2½ bytes conveying either the least significant bits of the frame count (4 bits) or the 256-frame count (20 bits), whilst the data on said second line during the second part of each bus cycle period comprises a data block of either 30 or 28 bytes, depending on the length of said further block comprising information for said receiver from said sub-system.

With such a receiver the status block may provide the following status information:
i. the type of entitlement message in the case of the three 93 byte data blocks,
ii. the validity of the keying block, and
iii. the length and hence content of the said further block conveying frame count information.

BRIEF DESCRIPTION OF THE DRAWINGS

The above and other features of the invention will now be described, by way of example, with reference to the accompanying drawings, in which.

DETAILED DESCRIPTION OF THE INVENTION

Figure 1:
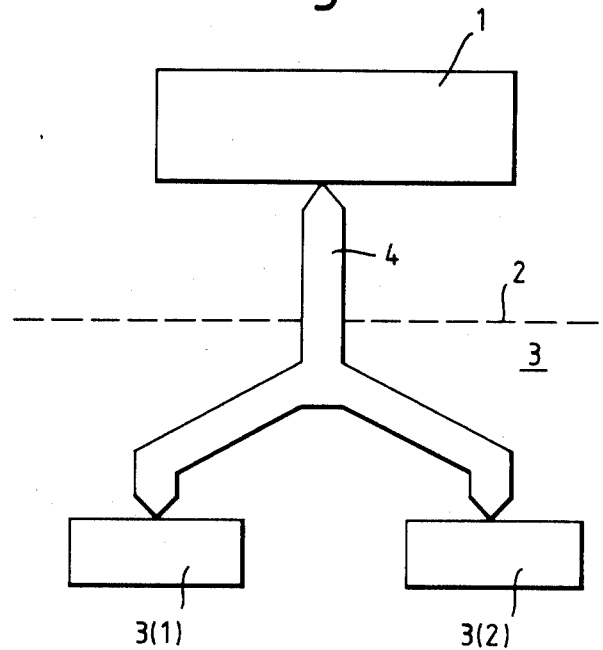
FIG. 1 is a block diagram of a receiver and its interface arrangement for use with the present invention.

FIG. 1 is a block diagram showing the connection between a receiver and conditional access sub-systems which may be internal with or external to the receiver. The reference 1 indicates the receiver with its associated signal decoders and which may be a television receiver suitable for the reception of one or more forms of the MAC-packet family as specified in the EBU documents SPB 284 and SPB 352 referred to above. The receiver 1 will then include the hardware necessary to demultiplex entitlement message packets as specified in part 5 of the above EBU documents. The broken line 2 indicates the boundary between the receiver 1 and a conditional access sub-system(s) 3 which although physically separated from each other may be accommodated in the television receiver or external thereto.

The receiver 1 and conditional access sub-system(s) 3 are interconnected by way of an interface bus 4. The CA sub-system(s) contain the customer address, the software for decoding the over-air data and the decryption algorithms. For television receivers that require to decode separately encrypted services simultaneously then a number of sets of conditional access sub-systems and consequently interfaces will be required. FIG. 1 shows two CA sub-systems 3(1) and 3(2) connected to a common interface.

Figure 2:
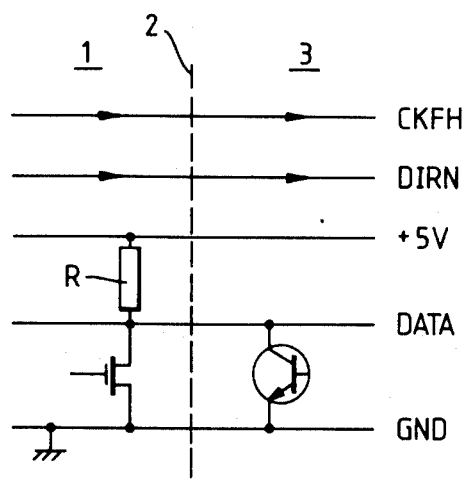
FIG. 2 is a diagram of a bus for use with the interface arrangement in FIG. 1.

FIG. 2 shows the five lines required for the bus 4 of FIG. 1. The reference 2 again indicates the boundary between the receiver 1 and the CA sub-system(s) 3. The five lines are as follows:

CKFH—conveys line frequency (15.625 kHz) clock pulses positive edges of which synchronise data transitions. Compatible with TTL.

DIRN—indicates the direction of transmission on the DATA line. When 'high' denotes receiver is transmitting, 'low' denotes CA sub-system is transmitting. Transitions synchronised to the positive edges of CKFH. Compatible with TTL.

+5V—conveys +5 volts for energising CA sub-system.

DATA—bi-directional data line (open drain/collector input/output). Compatible with TTL. For pull-up, resistor R is placed on receiver side at interface boundary. Data as seen at interface should be logically 'true'.

GND—line at ground or earth potential.

Figure 3:
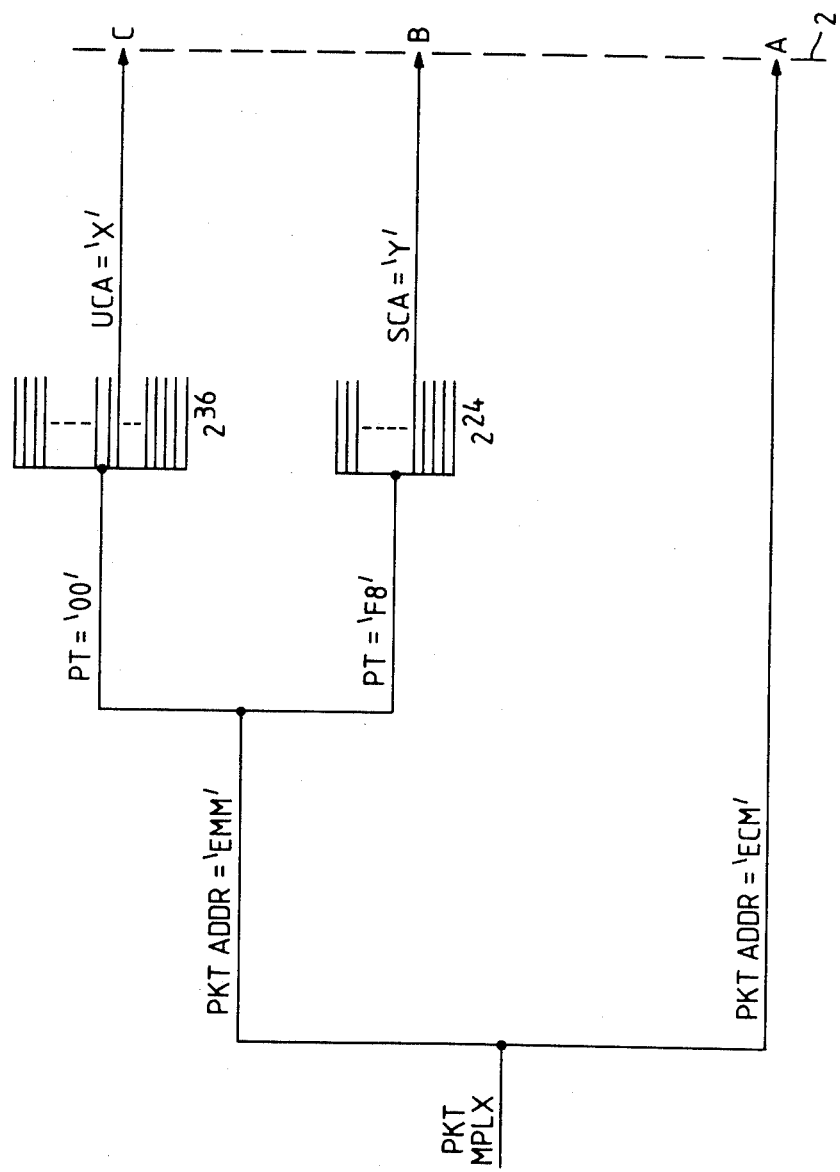
FIG. 3 is a diagram of a demultiplexing process.

With the MAC-packet family of signals the recovery of the Entitlement Checking Message (ECM) and Entitlement Management Message (EMM) packets relevant to a particular user can be thought of as a packet demultiplexing operation. FIG. 3 provides a diagrammatic representation of the demultiplexing process which takes place at three levels. These levels are:

i. packet address level—the packets having the packet addresses (PKT ADDR) for ECM and EMM are selected from the packet multiplex (PKT MPLX),
ii. packet type level—the packet types (PT) '00' and 'F8' are selected from the EMM packets, and
iii. customer address level—selection of a particular UCA (X) from a possible $2^{36}$ values from the packet type '00' and selection of a particular SCA (Y) from a possible $2^{24}$ values from the packet type 'F8'.

In this demultiplexing process, only the packet type (PT) level demultiplexing is 'automatic', in the sense that the values of packet address and customer address (i.e. demultiplexer select controls) are programmable. Thus it can be seen that packets arriving at the interface can come from three identifiable sources, which are:
(A) ECM packets, selected only by packet address.
(B) EMM packets, with PT='F8', selected via a 24 bit demultiplexer (SCA).
(C) EMM packets, with PT='00', selected via a 36 bit demultiplexer (UCA).

The derivation of the demultiplexer controls at the packet address and customer address levels will now be considered. The 24 bit demultiplexer address (SCA) and 36 bit demultiplexer address (UCA) must always be provided by the CA sub-system. However, the packet address for the EMM packets and that for the ECM packets associated with the recovery of the control words for a scrambled service set are, in general, derived from the service information in packet '0'. Specifically, the EMM packet address is derived from data item (LISTX) for the over-air addressing service, whilst the relevant ECM packet address comes from data item (ACCM). These values will be referred to as the implicit values.

In order to provide the greatest degree of fexibility, the facility to replace either of these implicit addresses with an explicit value, supplied by the conditional access sub-system, is included in the interface structure. Corresponding facilities to restore the implicit addresses are also provided. Thus all the demultiplexer controls at the packet and customer address levels required in FIG. 3 can be programmed by the sub-system.

Figure 4:
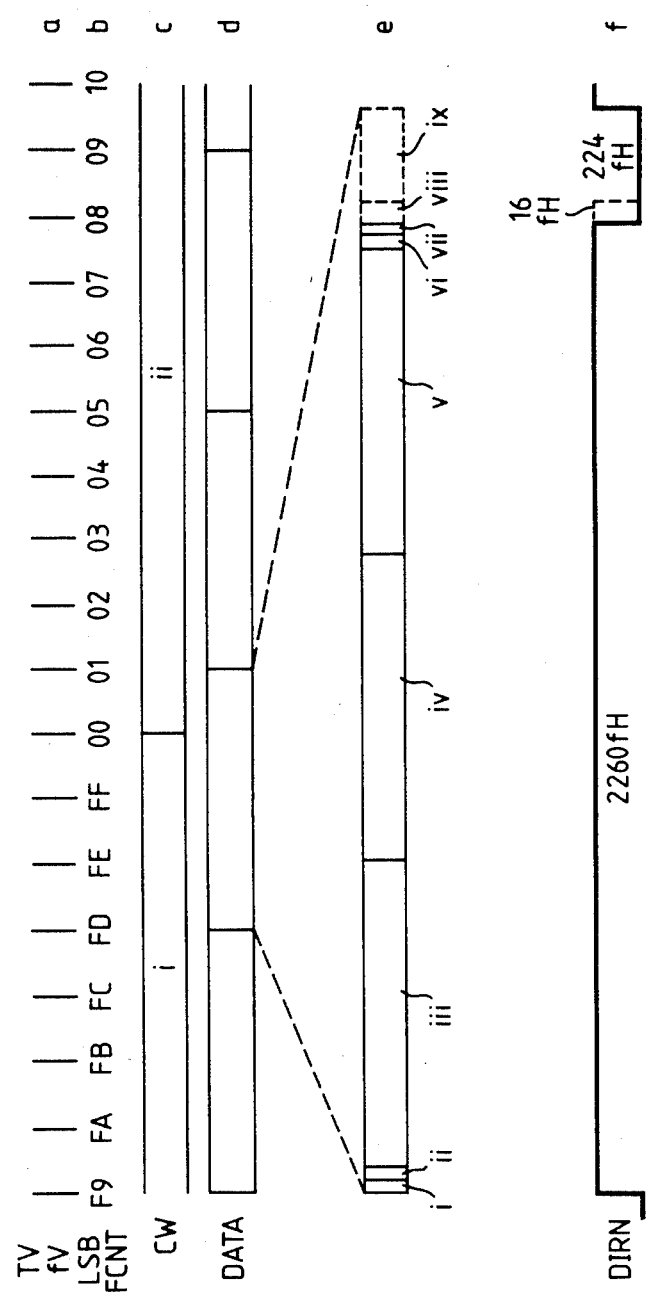
FIG. 4 shows signal and timing diagrams for the bus of FIG. 2.

FIG. 4 shows the DATA and the DIRN signals conveyed by the bus 4 together with frame and control word information. The periods indicated between the vertical lines in FIG. 4a are television frame periods each of 40 m secs, whilst FIG. 4b gives the eight least significant bits of the frame count for the frame periods of FIG. 4a in hexadecimal. In FIG. 4c the division at the frame having the count 00 is the boundary between old (i) and new (ii) control words CW1 and CW2 in use and produced in the CA sub-system, these control words being changed every 256 frames. The data transmitted over the bus 4 of FIG. 1 is shown in FIGS. 4d and 4e, FIG. 4d showing that this data is transmitted in equal data periods each of which is the length of four television frame periods whilst FIG. 4e is the expansion of one such data period. FIG. 4f is to the same scale as FIG. 4e and shows the direction of transmission signal DIRN which is 'high' for 2260 or 2276 television line periods (fH) during which data passes from the receiver to the CA sub-system and 'low' for 240 or 224 line periods respectively during which data passes from the CA sub-system to the receiver, the reason for the difference of 16 line periods being explained hereinafter. The composition of each data block as shown in FIG. 4e is as follows:

i. 1 byte unique address for CA sub-system. Enables the receiver to operate with a number of sub-systems and individually "talk" to each sub-system by the use of a unique address. Thus each sub-system must be allocated a unique address. No sub-system is permitted to transmit information by way of the interface until it has been addressed by the MAC decoder, ii. 1 byte status information. Contains information about the validity and source of the following data blocks (iii), (iv) and (v), the validity of block (vi), and the presence or absence of block (viii).

iii,iv,v. 93 bytes each. Three data blocks of equal length to which ECM and EMM packets of data are dynamically allocated.

vi. 1 byte. A 'key pressed' block which permits the transmission of keyboard or remote control commands to the CA sub-system.

vii,viii. respectively ½ and 2 bytes. Carries frame count information. Because in some cases the 20 bit 256-frame count (CAFCNT) is used directly for the derivation of control words by the CA sub-system, the means to transmit this count value must be provided. However, because the bus cycle period of four TV frames contains a non-integral number of 8 bit bytes (312½ bytes or 2500 bits), the four least significant bits of (CAFCNT) are always transmitted during period (vii). In those cases where the 20 bit count is required by the CA sub-system, the MAC decoder transmission time is extended by 2 bytes (period viii), and the full 20 bits are sent. This ensures that the CA sub-system transmission time always contains an integral number of bytes.

The above blocks i to vii or i to viii (depending on whether or not the full frame count is transmitted) are conveyed from the receiver (MAC decoder) to the CA sub-system.

viii,ix. respectively 2 and 28 bytes. A period of 28 or 30 bytes during which the CA sub-system transmits information to the receiver (MAC decoder), the length of this period depending on whether or not the full frame count is transmitted from the receiver to the CA sub-system.

In the above data all bytes are 8 bits in length with the bit rate corresponding to the line rate.

The 1 byte status information block (ii) comprises, in order of transmission three 2-bit codes indicating the source and validity of the data in the packet slots iii, iv and v, respectively. Each 2-bit code is interpreted in the following manner:

| | | |
|---|---|---|
| 0 | 0 | this packet slot contains invalid information, or a packet previously transmitted on the interface bus. |
| 0 | 1 | this packet slot contains a new valid packet, derived from the ECM channel (source A in FIG. 3). |
| 1 | 0 | this packet slot contains a new valid packet, derived from the EMM channel via the 24 bit demultiplexer (source B in FIG. 3). |
| 1 | 1 | this packet slot contains a new valid packet, derived from the EMM channel via the 36 bit demultiplexer (source C in FIG. 3). |

These three 2-bit codes are followed by a 1 bit code indicating the validity of the 'key pressed' block vi (binary '1'=valid) and a final 1-bit code indicating the presence or otherwise of the final 2 bytes viii of the frame count (binary '1'=present).

The three data blocks iii, iv and v each 93 bytes in length each contain 91 bytes of data as received by the MAC decoder which are preceded by 2 bytes of packet address information. Within these 2 bytes the order of transmission is:

a. packet address—10 bits with least significant bit first.
b. continuity index—2 bits with least significant bit first.
c. currently unallocated—4 bits.

The packet address and continuity index are presented by the MAC decoder Golay corrected; the Golay (23, 12) protection suffix is not transmitted.

The information transmitted from the CA sub-system to the MAC decoder during the periods viii and ix or just during period ix can include the control words CW1 and CW2 required to decode the received service or text for display, such as simple text intended for user guidance and confidence (e.g. price codes of service), or any other information required by the receiver from the sub-system. The transmission of these is performed using a byte-organised, variable format system of commands. Each command or data item is identified by a one byte code (the command identifier) followed, where appropriate, by a number of data bytes. In some cases the data field is of variable length and a length indicator byte is also provided. Subject to certain restrictions commands may be sent in any order and at any time within the period (viii, ix) allocated for sub-system transmission. Each command must be wholly confined within the 28 or 30 byte sub-system transmission period.

I claim:

1. A receiver having an interface arrangement for connection between said receiver and a conditional access sub-system and comprising a bus having a first line for conveying clock signals at television line frequency rate from said receiver to said sub-system, a second line for conveying data with a bit rate corresponding to that of the clock signal from said receiver to said sub-system during a first part of a bus cycle period and from said sub-system to said receiver during the remaining part of said bus cycle period, and a third line for conveying a direction signal indicating to said sub-system the direction of data travel on said second line, the bus cycle period having a duration equal to four television frame periods, the data on said second line during the first part of each bus cycle period including:

i. an address block containing the unique address of the sub-system with which said receiver is in communication, ii. a status block providing status information for individual following blocks in the first part of the bus cycle period,
iii. a plurality of data blocks each of equal length and each conveying entitlement sessages, and
iv. a further block having either a first or a second greater duration which provides information relating to a frame count, said status block in the case of said data blocks of equal length indicating the type of entitlement message being conveyed in each such block while in the case of said further block said status block indicates the duration of the said further block.

2. A receiver as claimed in claim 1, in which said further block when of said first duration conveys the least significant bits of said frame count.

3. A receiver as claimed in claim 1, in which the data on the said second line during the first part of each bus cycle period additionally includes a keying block which conveys keyboard or remote control commands, the status block in the case of the keying block indicating the validity of the keying block.

4. A receiver having an interface arrangement for connection between said receiver and a conditional access sub-system and comprising a bus having a first line for conveying clock signals at television line frequency rate from said receiver to said sub-system, a second line for conveying data with a bit rate corresponding to that of the clock signal and with 8 bits per byte from said receiver to said sub-system during a first part of a bus cycle period and from said sub-system to said receiver during the remaining part of said bus cycle period, and a third line for conveying a direction signal indicating to said sub-system the direction of data travel on said second line, the bus cycle period having a duration equal to four television frame periods, the data on said second line during the first part of each bus cycle period including sequentially:
i. an address block of 1 byte containing the unique address of the sub-system with which said receiver is in communication,
ii. a status block of 1 byte providing status information for the following and remaining individual blocks in the first part of the bus cycle period,
iii. three data blocks each of 93 bytes and each containing an entitlement message,
iv. a keying block of 1 byte conveying keyboard or remote control commands, and
v. a further block of either ½ byte or 2½ bytes conveying either the least significant bits of the frame count (4 bits) or the 256-frame count (20 bits), while the data on said second line during the second part of each bus cycle period comprises a data block of either 30 or 28 bytes, depending on the length of said further block, comprising information for said receiver from said sub-system.

5. A receiver as claimed in claim 4, in which the status block provides the following status information:
i. the type of entitlement message in the case of the three 93 byte data blocks,
ii. the validity of the keying block, and
iii. the length and hence content of the said further block conveying frame count information.

6. A receiver as claimed in claim 2, in which the data on the said second line during the first part of each bus cycle period additionally includes a keying block which conveys keyboard or remote control commands, the status block in the case of the keying block indicating the validity of the keying block.

* * * * *